(12) United States Patent
Lindquist et al.

(10) Patent No.: US 12,001,053 B1
(45) Date of Patent: Jun. 4, 2024

(54) SYSTEMS AND METHODS FOR PROCESSING OPTICAL SIGNALS

(71) Applicant: Board of Trustees of the University of Alabama, for and on behalf of the University of Alabama in Huntsville, Huntsville, AL (US)

(72) Inventors: Robert Lindquist, Madison, AL (US); Patrick Reardon, Madison, AL (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 16/992,557

(22) Filed: Aug. 13, 2020

Related U.S. Application Data

(60) Provisional application No. 62/886,669, filed on Aug. 14, 2019.

(51) Int. Cl.
  *G02B 6/12* (2006.01)
  *G02B 6/122* (2006.01)
  *G02B 6/13* (2006.01)

(52) U.S. Cl.
  CPC ......... *G02B 6/12007* (2013.01); *G02B 6/122* (2013.01); *G02B 6/13* (2013.01); *G02B 2006/12109* (2013.01); *G02B 2006/12145* (2013.01); *G02B 2006/1215* (2013.01)

(58) Field of Classification Search
  CPC ...... G02B 6/12007; G02B 6/122; G02B 6/13; G02B 2006/12109; G02B 2006/12145; G02B 2006/1215

USPC .......................................................... 385/14
See application file for complete search history.

(56) References Cited

U.S. PATENT DOCUMENTS

| | | | |
|---|---|---|---|
| 5,972,542 A | * | 10/1999 | Starodubov ........ G02B 6/02138 430/5 |
| 9,804,251 B1 | | 10/2017 | Reardon |
| 2003/0002809 A1 | * | 1/2003 | Jian ........................ G02B 6/423 385/73 |

OTHER PUBLICATIONS

Alter, et al., "An Introduction to Fiber Optic Imaging," Schott North America, Inc., Feb. 2007, pp. 10-55.
(Continued)

*Primary Examiner* — Jerry M Blevins
(74) *Attorney, Agent, or Firm* — Butler Snow LLP; Jon E. Holland

(57) ABSTRACT

The present disclosure generally pertains to systems and methods for processing optical signals. In some embodiments, an optical system has an optical device for receiving a plurality of optical signals and processing such signals in a desired way. The optical device has one or more functional layers that are separated by buffer layers. The index of refraction of at various points in each functional layer is controlled during manufacturing so that the functional layer performs one or more optical functions or, in other words, manipulates one or more incoming optical signals in a desired way, such as switching, filtering, splitting, focusing, collimating, etc. As an example, the index of refraction profile within a region of a functional layer may be controlled so that an incoming signal from a first optical fiber is redirected for reception by a second optical fiber that is not aligned with the first optical fiber.

23 Claims, 4 Drawing Sheets

(56) References Cited

OTHER PUBLICATIONS

Duncan T. Moore, "Gradient-index optics: a review", Applied Optics, vol. 19, Issue 7, Apr. 1, 1980, pp. 1035-1038.
Koo et al., "UV written waveguides using crosslinkable PMMA-based copolymers", Summaries of Papers Presented at the Lasers and Electro-Optics. CLEO '02. Technical Diges, vol. 1, May 24, 2002, pp. 490-491.

* cited by examiner

SYSTEMS AND METHODS FOR PROCESSING OPTICAL SIGNALS

RELATED ART

This application claims priority to U.S. Provisional Application No. 62/886,669, entitled "Additive Solid Optics Manufacturing" and filed on Aug. 14, 2019, which is incorporated herein by reference.

In optical systems, optical signals from a large number of sources may be processed in a variety of ways. As an example, one or more optical switches might receive optical signals from a plurality of fibers and direct the received signals to one or more other fibers according to a desired mapping scheme for the network. In other examples, optical signals may be processed in other ways, such as filtering, splitting, multiplexing, focusing, collimating, etc.

Optical components for processing signals within an optical network are typically expensive, and it can be extremely costly and burdensome for a service provider to implement a network that processes a large number of optical signals in a desired way. Moreover, improved techniques for manufacturing reliable optical components at a low cost are generally desired. It is desirable for such components to be robust, highly scalable, and easily-configurable for use in a network according to a desired network configuration.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for processing optical signals. In some embodiments, an optical system comprises an optical device for receiving a plurality of optical signals and processing such signals in a desired way. The optical device has one or more functional layers that are separated by buffer layers. The index of refraction at various points in each of the functional layers is controlled during manufacturing so that the functional layer performs one or more optical functions or, in other words, manipulates one or more incoming optical signals in a desired way, such as switching, filtering, splitting, focusing, collimating, etc. As an example, the index of refraction profile within a region of a functional layer may be controlled so that an incoming signal from a first optical fiber is redirected for reception by a second optical fiber that is not aligned with the first optical fiber. Each buffer layer may have a substantially constant index of refraction such that the buffer layer carries optical signals between functional layers without substantially altering the optical signals or their paths. In other embodiments, a buffer layer may optically manipulate any of the signals passing through it as may be desired.

In some embodiments, additive solid optics manufacturing may be used to fabricate the optical device. In this regard, the various layers of the optical device may be formed through three-dimensional (3D) printing or other manufacturing techniques, and the index of refraction profile in various regions of each functional layer may be tailored according to the desired function to be performed on an incoming optical signal for the region. 3D printing or screen printing may be used to selectively control the index of refraction profile at different locations within a functional layer. In other embodiments, other types of manufacturing, such as photolithography, may be used to selectively change or otherwise control the index of refraction in different regions. Using such additive solid optics manufacturing, each layer can be formed to process a large number of optical signals in bulk, and the optical device can be manufactured at a relatively low cost. Further, the optical device can be easily configured during manufacturing to individually process a large number of optical signals making the optical device highly-scalable and also easily configurable for nearly any desired network configuration.

Figure 1:
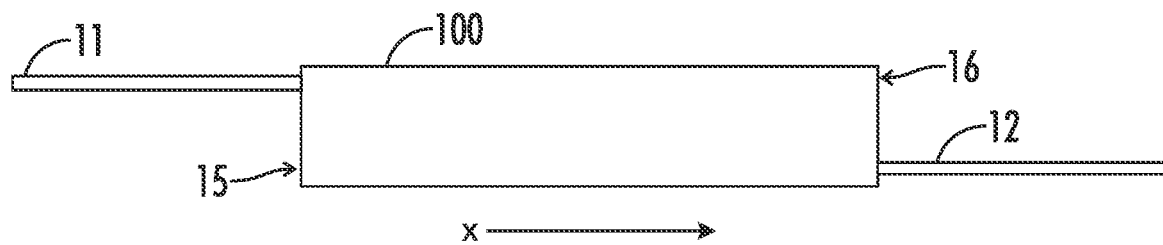
FIG. 1 is a block diagram illustrating an exemplary embodiment of an optical communication system having an optical device interfaced with optical fibers.

FIG. 1 is a block diagram depicting an exemplary optical communication system 10 having an optical device 100 for processing optical signals. As shown by FIG. 1, the optical device 100 has opposite ends 15, 16 respectively coupled to a pair of optical fibers 11, 12. In practice, each end 15, 16 of the optical device 100 may be optically interfaced with a large number of optical fibers, but FIG. 1 shows just two optical fibers 15, 16 for simplicity of illustration. In this regard, each end 15, 16 may have a flat surface, and an endface of the optical fiber 11 may face and abut the flat surface of the end 15 such that an optical signal carried by the fiber 11 enters the device 100 through the end 15 and propagates through the device 100 to the end 16. Further, an endface of the optical fiber 12 may face and abut the flat surface of the end 16 such that the aforementioned optical signal exits the end 16 and enters the optical fiber 12. The optical fiber 12 may be spatially offset relative to the optical fiber 11 such that the device 100 alters the path of the signal in order for it to be received by the optical fiber 12. That is, the optical device 100 may function as an optical switch that maps the incoming signal from the fiber 11 to the fiber 12. Thus, when multiple fibers are interfaced at each end 15, 16, the device 100 may map a signal from any fiber 11 on one end 15 to any fiber 12 on the other end 16, as will be described in more detail below. In addition, as also described in more detail below, the device 100 may be configured to perform other functions for optically manipulating signals propagating through the device 100.

Figure 2:
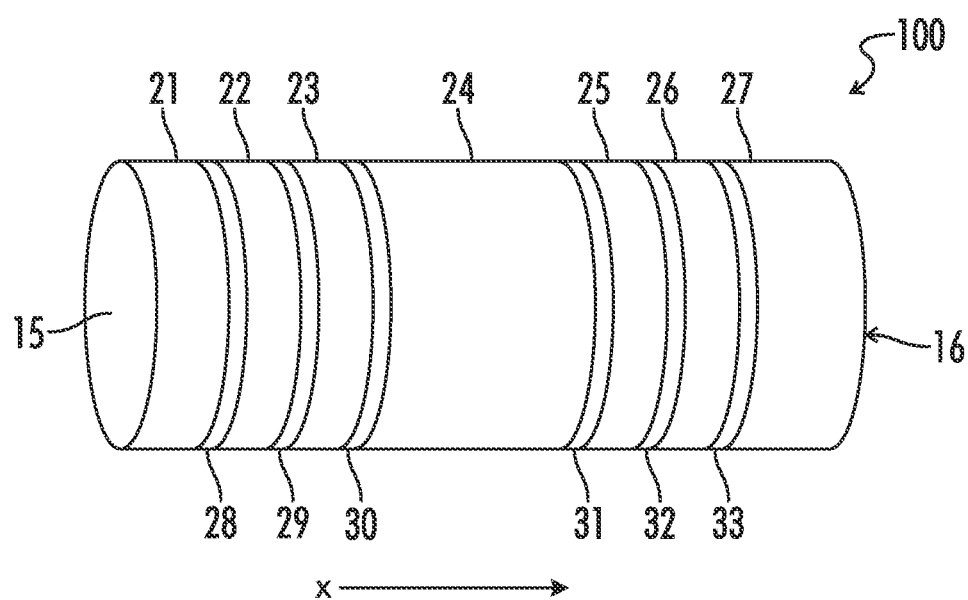
FIG. 2 depicts a side view of an optical device, such as is depicted by FIG. 1.

FIG. 2 depicts a side view of the optical device 100. The exemplary optical device 100 may be of circular cross-section and the cross-sectional area may be on the order of about 1 to 10 square centimeters (cm$^2$), for example. In other embodiments, the optical device 100 may have other cross-sectional shapes, such as a square cross-section, and other dimensions.

As shown by FIG. 2, the optical device 100 comprises a plurality of buffer layers 21-27 separating a plurality of functional layers 28-33 that are configured to optically manipulate the optical signals as they pass through the optical device 100. In an exemplary embodiment, the functional layers 28-33 and the buffer layers 21-27 are sequentially arranged such that a functional layer 28-33 exists between a successive pair of buffer layers 21-27, as shown. Each functional layer and the following buffer layer on which it is formed may be referred to as a "stage" of the optical device 100. Thus, the exemplary embodiment of FIG. 2 shows six stages that optically manipulate signals that pass through the device 100. In other embodiments, other arrangements of the optical device 100, including other numbers of stages, are possible.

The functional layers 28-33 are configured to perform one or more optical functions including, but not limited to, switching, filtering, splitting, focusing, collimating, etc. As an example, a functional layer 28-33 may be configured with a material in a region that receives an optical signal for spatially diverting the optical signal to change its path. Using such techniques, the path through the device 100 for an optical signal received at one point on the end 15 may be controlled so that the optical signal exits the end 16 at any desired point. That is, the optical signal may be diverted at one or more functional layers 28-33 in the device 100 so that the signal exits at a desired point of the end 16. Thus, the device 100 may map one optical fiber 11 abutting the end 15 to another optical fiber 12 abutting the end 16 so that an optical signal from the fiber 11 travels through the device 100 and is received by the optical fiber 12 even though the two fibers 11, 12 are not spatially aligned in the x-direction. Thus, as will be described in more detail below, using these techniques, it is possible to map any of a plurality of fibers abutting the end 15 to any of a plurality of fibers abutting the end 16 so that a signal propagating along fiber at the end 15 is received by any desired fiber at the end 16.

Note that, as described herein, two fibers are spatially aligned when a signal output from the core of one fiber is received by the core of the other fiber without the signal changing path between the two fibers. Thus, two fibers are precisely aligned with one another when the longitudinal axis of one fiber is aligned with the longitudinal axis of the other fiber. That is, both fibers essentially share the same longitudinal axis. However, one of ordinary skill will appreciate that, depending on the sizes of the cores, a small amount of offset may exist between spatially aligned fibers such that a signal propagating along one of the fibers will be received by the other fiber without changing the path of the signal.

In some embodiments, the buffer layers 21-27 are configured to serve as a free space for propagation of the optical signals. In this regard, the index of refraction of each buffer 21-27 may be constant so that the buffer layers 21-27 do not optically manipulate the optical signals, such as changing the paths of the optical signals. Thus, for a given buffer layer 21-27, the path that an optical signal follows from the surface through which signal enters the respective buffer layer to the surface from which the signal exits the respective buffer layer may have a constant index of refraction such that the signal is not significantly changed by passing through buffer layer.

Figure 3:
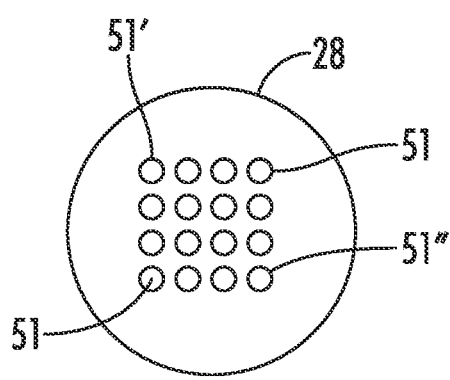
FIG. 3 depicts a front view of a functional layer of the optical device depicted by FIG. 2.
Figure 4:
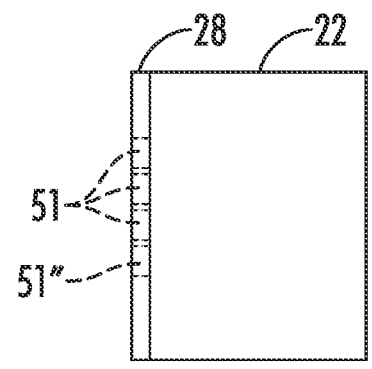
FIG. 4 depicts a side view of a stage of the optical device depicted by FIG. 2 having the functional layer depicted by FIG. 3 and a buffer layer.

FIG. 3 depicts a front view a functional layer 28, and FIG. 4 shows a side view of the functional layer 28 and the buffer layer 22 on which the functional layer 28 is formed. That is, FIG. 3 shows a front of a stage of the device 100, and FIG. 4 shows a side view of the same stage. As shown by FIG. 3, the functional layer 28 has a plurality of regions 51, referred to hereafter as "signal processing regions," that respectively process optical signals. In this regard, each signal processing region 51 is positioned to receive a respective incoming optical signal. As an example, the region 51' may be spatially aligned in the x-direction with the optical fiber 11 (FIG. 1) to receive an optical signal from the fiber 11. In other embodiments for which a plurality of optical fibers abut the end 15, each region 51 may be spatially aligned in the x-direction with a respective fiber to receive an optical signal from that fiber. Further, the index of refraction for each region 51 is controlled during manufacturing so that the region 51 performs a desired function on the received signal. In addition, the other functional layers 23-27 may be similarly arranged as shown by FIG. 3 to have different signal processing regions for processing optical signals in desired ways. Thus, as a signal progresses from one functional layer to another, it can be processed in various ways, as described further herein.

Figure 5:
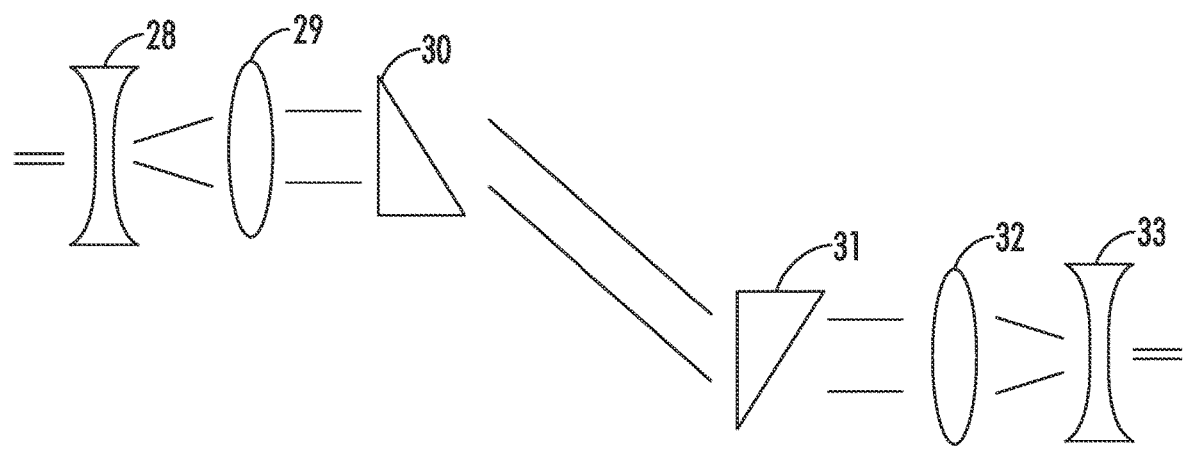
FIG. 5 is a functional block diagram illustrating an exemplary optical path through an optical device, such as is depicted by FIG. 2.

To better illustrate the foregoing, assume that it is desirable for the device 100 to map the optical fiber 11 to the optical fiber 12 such that a signal carried by the optical fiber 11 is received by the optical fiber 12 even though the fibers 11, 12 are not spatially aligned with each other in the x-direction. FIG. 5 is a functional block diagram for the path of the signal from the fiber 11, and FIG. 6 depicts a front view of each functional layer 28-33.

Figure 6:
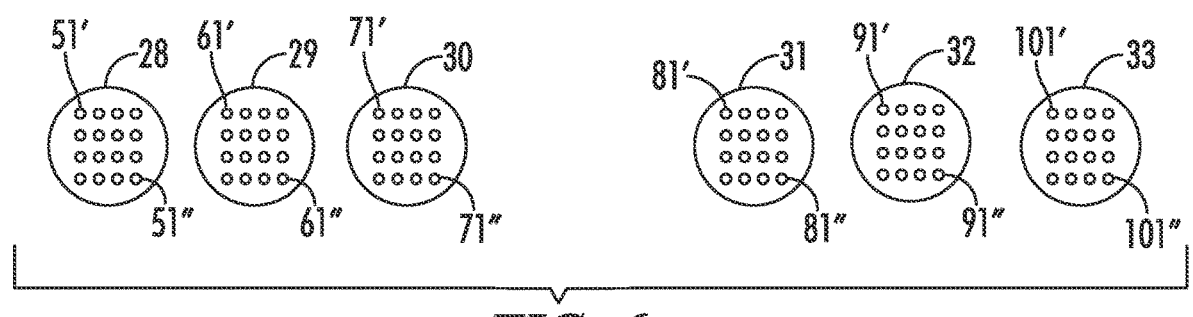
FIG. 6 depicts a front view of a plurality of functional layers of an optical device, such as is depicted by FIG. 2.

Referring to FIG. 6, the functional layers 28-33 have signal processing regions 51', 61', 71', 81', 91', 101', respectively, and these regions 51', 61', 71', 81', 91', 101' are spatially aligned with each other, as well as fiber 11, in the x-direction. That is, a line passes from the core of the fiber 11 through each of the regions 51', 61', 71', 81', 91', 101'. Thus, if the path of a signal from the fiber 11 is not changed, it should pass through each region 51', 61', 71', 81', 91', 101'.

In addition, the functional layers 28-33 have signal processing regions 51", 61", 71", 81", 91", 101", respectively, where these regions 51", 61", 71", 81", 91", 101" are aligned with each other, as well as fiber 12, in the x-direction. That is, a line passes from the core of the fiber 12 through each of the regions 51", 61", 71", 81", 91", 101".

As shown by FIG. 5, the functional layer 28 is configured to function as a beam expander for the optical signal from the fiber 11. In this regard, the index of refraction of the signal processing region 51' through which the signal passes is controlled during manufacturing of the device 100 so that the signal is expanded by the signal processing region 51'. Further, the functional layer 29 is configured to function as a collimator for the optical signal from the fiber 11. In this regard, the index of refraction of the signal processing region 61' through which the signal passes is controlled during manufacturing of the device 100 so that the signal is collimated by the signal processing region 61'.

The functional layer 30 is configured to function as a beam redirector for the optical signal from the fiber 11. In this regard, the index of refraction of the signal processing region 71' through which the signal passes is controlled during manufacturing of the device 100 so that the signal is redirected by the signal processing region 71'. In the exemplary embodiment shown, the signal is redirected toward the signal processing region 81" of the functional layer 31. Thus, the signal processing region 71' of the functional layer 30 changes the path of the signal from the fiber 11 so that the signal passes to the signal processing region 81" of the functional layer 31 instead of the signal processing region 81' that is spatially aligned with the fiber 11 in the x-direction. Notably, the signal processing region 81" is spatially aligned with the fiber 12 in the x-direction in the exemplary embodiment shown.

The functional layer 31 is configured to function as a beam redirector for the optical signal from the fiber 11. In this regard, the index of refraction of the signal processing region 81" through which the signal passes is controlled during manufacturing of the device 100 so that the signal is redirected by the signal processing region 81" toward the fiber 12. Thus, the signal processing region 81" of the functional layer 31 changes the path of the signal from the fiber 11 so that the signal passes to the signal processing region 91" of the functional layer 32.

The functional layer 32 is configured to function as a lens for the optical signal from the fiber 11. In this regard, the index of refraction of the signal processing region 91" through which the signal passes is controlled during manufacturing of the device 100 so that the signal is focused by the signal processing region 91" on the signal processing region 101". Further, the functional layer 33 is configured to function as a beam expander for the optical signal from the fiber 11. In this regard, the index of refraction of the signal processing region 101" through which the signal passes is controlled during manufacturing of the device 100 so that the signal is expanded by the signal processing region 101" before it is received by the fiber 12.

As described above, any number of fibers at the end 15 may be mapped to any number of fibers at the end 16 using the techniques described above for mapping the fiber 11 to the fiber 12 regardless of the spatial relationships between the fibers at the end 15 relative to the fibers at the end 16. Thus, the device 100 may implement an optical switch for any number of fibers. Further, it is possible for a fiber at one end 15 to be mapped to a plurality of fibers at the opposite end 16 of the device 16. In this regard, a functional layer of the device 100 may be configured to split an optical signal and direct components of the split signal to different signal processing regions of the next functional layer so that the signal is ultimately received by a plurality of fibers.

The refractive index profiles of the functional layers 28-33 of optical device 100 may be controlled during manufacturing process using any of various manufacturing techniques. As an example, the various layers of the optical device 100 may be formed through 3D or screen printing. In performing such printing, each of the signal processing regions, such as signal processing regions 51', 51" of functional layer 28, may be independently controlled to have its desired optical properties for processing the optical signal to be received by it during operation.

In other embodiments, the layers of the optical device 100 may be deposited or otherwise formed using conventional batch fabrication techniques other than printing, such as chemical vapor deposition (CVD) and photolithography. In some embodiments, the various layers of the optical device 100 may be composed of a transparent polymer or glass. As an example, as the layers are deposited, photolithography may be used to selectively control the index of refraction profile of each signal processing region. In this regard, to form the signal processing regions, such as signal processing regions 51', 51" of functional layer 28, for example, ultraviolet (UV) radiation may be directed to the regions 51', 51", each of which has an index of refraction that changes in response to the UV radiation. By selectively controlling the intensity and duration of exposure of each signal processing region 51', 51" to UV radiation, the index of refraction profile of each such region 51', 51" may be independently controlled to have its desired optical properties for processing the optical signal to be received by it during operation.

Note that, during manufacturing, the buffer layers help to prevent the UV radiation used for forming the signal processing regions on one functional layer to affect the optical properties of the next functional layer. As an example, the buffer layer 22 between the functional layers 28, 29 may help to prevent UV radiation used to form the signal processing regions 51', 51" from reaching the functional layer 29, thereby preventing such UV radiation from affecting the functional layer 29. Also note that the signal processing regions of any of the functional layers 28-33 may be selectively controlled using the techniques describe above for the signal processing regions 51', 51".

In some embodiments, the width of the initial preform for the layers of the optical device 100 may be greater than the ultimate dimensions intended for the device 100 during operation. Once the layers of the preform have been formed, including selective manipulation of the indexes of refraction of the signal processing regions, the width of the preform may be reduced to that ultimately desired for the optical device 100. Having a larger width for the preform during manipulation of the indexes of refraction of the signal processing regions in the functional layers 28-33 helps to increase the accuracy of index of refraction profile for the signal processing regions. In this regard, since the surface area of the signal processing regions is larger for the preform, manipulation of the indexes of refraction do not need to be as precise relative to an embodiment that attempts to form the signal processing regions on a smaller surface area.

In this regard, once the signal processing regions are formed, the preform can be drawn out or stretched by a drawing process in order to reduce the width of the optical device 100 relative to the preform. Commonly-assigned U.S. Pat. No. 9,804,251, entitled "Fiber Optic Directional Sensor with Wide-Field Expanding element and Method" and issued on Oct. 31, 2017, which is incorporated herein by reference, describes an exemplary manufacturing process that can be used to draw out or stretch a preform of fused optical fibers, and a similar process may be used to draw out or stretch the preform of the device 100 in order to reduce the scale of the device 100. As an example, the preform material prior to the draw process may have a width of about 10 cm, and the width of the device 100 after the draw process may be about 1 cm. In other embodiments, other dimensions and scale reductions are possible. Exemplary techniques for manufacturing the optical device 100 will be described in more detail below.

In some embodiments, the optical device 100 may be manufactured in two stages including a first stage (referred to hereinafter as "preform stage") to provide a preform using additive manufacturing techniques and a second stage (referred to hereinafter as a "drawing stage") (FIG. 8) for drawing out the preform to form a finalized optical device 100 having a smaller dimension than the preform. As known in the art, in an "additive" manufacturing method, successive layers of a device are deposited gradually forming the desired shape for the device. Printing, such as 3D printing or screen printing, and thin film deposition techniques, such as chemical vapor deposition, are examples of additive manufacturing techniques that can be used for the optical device 100, but other types of additive and non-additive techniques may be used for form the optical device 100, as may be desired.

Figure 7:
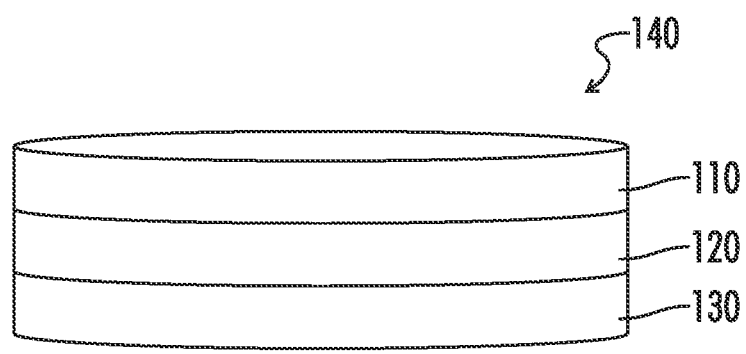
FIG. 7 depicts a side view of a preform during the manufacture of an optical device, such as is depicted by FIG. 2.

FIG. 7 depicts an exemplary preform 140 that may be used in the manufacture of the optical device 100. Initially, a substrate 130 is formed using any desired manufacturing technique, such a chemical vapor deposition. In the embodiment shown by FIG. 7, the cross-sectional shape of the preform 140 and the resulting device 100 is circular, but other types of shapes are possible in other embodiments. The substrate 130 may be relatively thick (in the y-direction), such as about 1 centimeter (cm), to provide mechanical integrity to the preform 140 and, in particular, to avoid warpage during the drawing stage, which will be described in more detail below. A width (e.g., diameter for a device) of the substrate 130 and resulting preform 140 in the x-direction may be on the order of about 10 cm, but other dimensions of the substrate 130 and preform 140 are possible in other embodiments. In one embodiment, the optical device 100 is composed of glass, and the substrate 130 is composed of a high purity silica. In another embodiment, the optical device 100 is composed of a polymer, and the substrate 130 is composed of poly methyl methacrylate (PMMA). In other embodiments, yet other materials for the device 100 and substrate 130 may be used.

Figure 8:
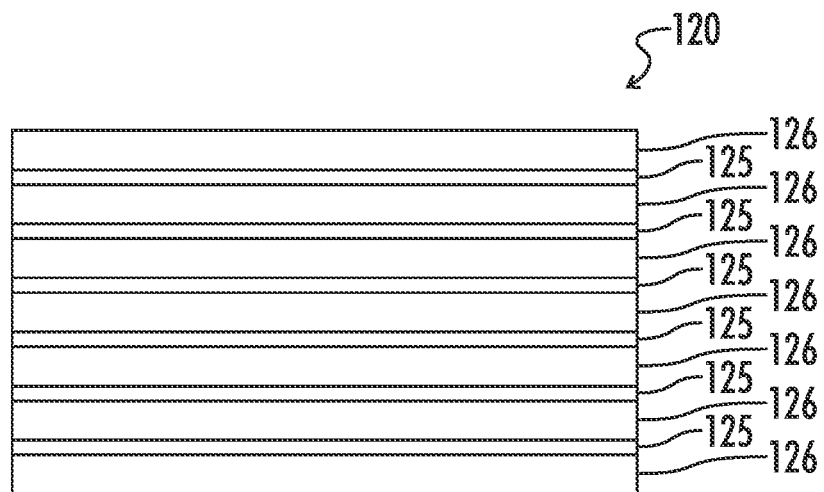
FIG. 8 depicts a side view of a preform layer depicted in FIG. 7.

After formation of the substrate 130, a preform layer 120 may be deposited or otherwise formed on the substrate 130. The preform layer 120 may be formed by depositing alternating layers of photosensitive material and non-photosensitive material to form photosensitive layers 125 and non-photosensitive layers 126 that separate the photosensitive layers 125, as shown by FIG. 8. Each photosensitive layer 125 corresponds to a respective functional layer of the device 100 and will be manipulated, as described in more detail below, to form its corresponding functional layer. Further, each non-photosensitive layer 125 corresponds to a respective buffer layer of the device 100 and will be manipulated, as described in more detail below, to form its corresponding buffer layer. Printing, such as 3D printing or screen printing, or thin film deposition, such as chemical vapor deposition, may be used to form the photosensitive layers 125 and the non-photosensitive layers 126. In some embodiments, the photosensitive layers 125 are relatively thin, such as just a few microns (e.g., less than 5 microns), and the non-photosensitive layers 126 are about 10 microns. However, other dimensions of the layers are possible in other embodiments.

When the optical device 100 is composed of glass, the material of the photosensitive layers 125 could be germanium-doped silica, and the layers 125 may be formed by flame hydrolysis or plasma-enhanced chemical vapor deposition (PECVD). When the optical device 100 is composed of a polymer, the material of the photosensitive layers 125 could be a PMMA, such as a PMMA containing about 51.6 wt % of 5,6-(2-benzofuryl)-2,3-di-(trifluoromethyl)-1,4,7,7-tetramethyl-2,5-norbornadiene (NBD4), and the layers 125 may be formed by spin coating. In other embodiments, other materials and other manufacturing techniques for the photosensitive layers 125 are possible.

Once a photosensitive layer 125 is formed, the refractive index may be altered in various regions corresponding to the signal processing regions of the corresponding functional layer of the device 100 by exposing such regions of the photosensitive layer 125 to UV radiation. In this regard, after deposition, the photosensitive layer 120 may be scanned across a source emitting UV radiation. The intensity and duration of the UV beam on a specific region determines the region's index of refraction. Thus, by controlling the intensity and duration of UV exposure at various regions in the photosensitive layer 125, the layer can be optically patterned with a two-dimensional (2D) refractive index profile as may be desired to achieve the desired signal processing by the corresponding functional layer in the device 100.

When the optical device 100 is composed of glass, the material of the non-photosensitive layers 126 could be silica, and the layers 126 may be formed by flame hydrolysis or PECVD. When the optical device 100 is composed of a polymer, the material of the non-photosensitive layers 126 could be a PMMA, and the layers 126 may be formed by spin coating. In other embodiments, other materials and other manufacturing techniques for the non-photosensitive layers 126 are possible.

The deposition of alternating layers of photosensitive material and non-photosensitive material may be continued until a photosensitive layer 125 has been formed for each functional layer 28-33 of the optical device 100 and a non-photosensitive layer 126 has been formed for each buffer layer 22-27 of the optical device 100. Once the preform layer 140 is deposited or otherwise formed, a cover layer 110 may be deposited or otherwise formed on the preform layer 140, as shown by FIG. 7.

Note that the deposition and patterning processes described above can be replaced with other manufacturing techniques, such as a 3D printing process (e.g., inkjet, laser sintering, or stereo lithography) wherein a 3D printable model is created with a computer aided design package or via a 3D scanner. The electronic three-dimensional model of the preform 140 may then be processed by a type of computer software, often referred to as a "slicer," which converts the model into a series of thin layers and produces a file containing instructions tailored to a specific printer. A 3D printer follows software instructions to lay down successive layers of materials to build the preform 140 from a series of cross sections. These layers, which correspond to the virtual cross sections from the CAD model, are joined or automatically fused to create the final preform 140. In other embodiments, yet other techniques of manufacturing the preform 140 are possible.

Once the preform 140 has been manufactured, a draw process may be used to draw or stretch the preform such that the diameter of the preform layer 120 is decreased. As an example, in some embodiments, the diameter is reduced by a factor of about 10 from about 10 cm to about 1 cm. However, other dimensions and scaling ratios are possible in other embodiments.

Figure 9:
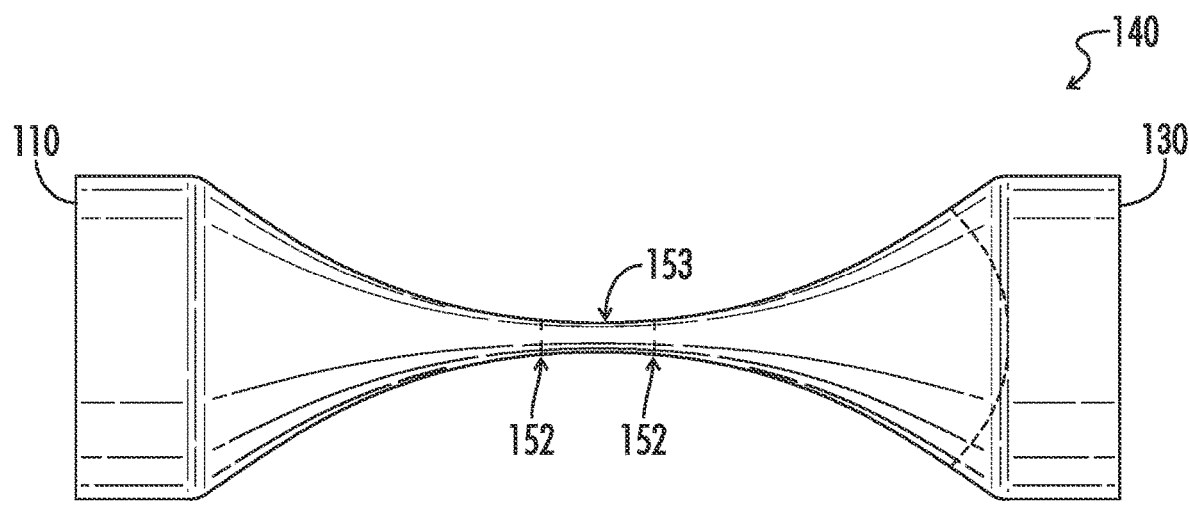
FIG. 9 depicts a side view of the preform depicted by FIG. 7 after drawing of the preform by an exemplary draw process.

During the draw process, the preform 140 is placed in furnace, which heats the preform 140 so that that material in the preform becomes soft allowing the preform 140 to stretch. Gravity or other force applied to the preform 140 via a conventional draw tower (not shown) causes the ends of the preform 140 to separate, thereby causing the middle of the preform 140 to stretch, including specifically the preform layer 120, as shown by FIG. 9. The preform 140 may be cut along the reference lines 152 to remove a portion 153 of the preform 140 between the reference lines 152 from the remainder of the preform 140. This removed portion 153 forms the optical device 100 that can then be used to process optical signals as described herein. Notably, the draw process described above is a conventional process that has been used to stretch other types of devices, such as optical fibers, and is described in more detail in U.S. Pat. No. 9,804,251.

The draw process is beneficial in the translation of the dimensions from the preform 140 to the optical device 100. In this regard, the feature size (e.g., the widths of the signal processing regions) is reduced from the preform 140 to the optical device 100 by a factor, M. The size reduction provides a benefit in manufacturing in that the patterning resolution is reduced by the factor M. In addition, the thicknesses of layers 22-33 of the optical device 100 may be increased during the draw process by a factor of the square of M or $M^2$, relative to the thicknesses of the corresponding layers of the preform 140. In some applications, it may be desirable for the functional layers 28-33 of the optical device 100 to have a minimum thickness on the order of a magnitude greater than the wavelength of light, and the $M^2$ increase in thickness from the preform 140 to the optical device 100 means that a thin layer can be deposited and processed at the preform stage while still achieving this goal.

Figure 10:
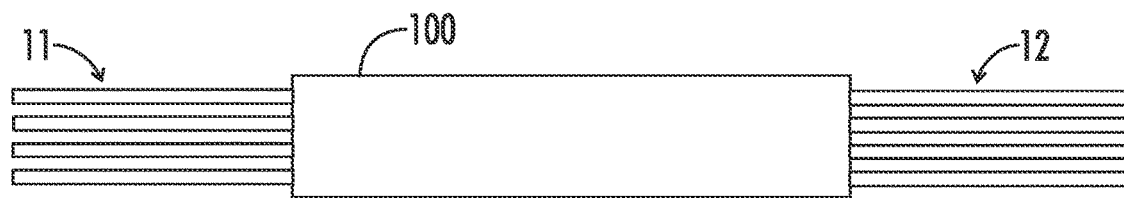
FIG. 10 is a block diagram illustrating an exemplary embodiment of an optical communication system having an optical device interfaced with optical fibers.

FIG. 10 shows an optical device 100 that is optically interfaced with a plurality of optical fibers 11 on one side and a plurality of optical fibers 12 on the opposite side. In this regard, each optical fiber 11 may be spatially aligned in the x-direction with a respective signal processing region 51 of the functional layer 28, and each optical fiber 12 may be spatially aligned in the x-direction with a respective signal processing region 101 of the functional layer 33. In this embodiment, the optical device 100 may be used to map optical signals from the plurality of optical fibers 11 to the plurality of optical fibers 12 according to a predefined mapping scheme. As an example, as described above, it may be desirable for an optical signal from an optical fiber 11 aligned with the signal processing region 51' of functional layer 28 to be mapped from such fiber 11 to an optical fiber 12 aligned with the signal processing region 101" of the functional layer 33. An optical signal from any other fiber 11 may be mapped to one or more of the fibers 12 as may be desired.

Based on the desired mappings, the index of refraction profiles for the signal processing regions within the device 100 may be selected and controlled during manufacturing in order to effectuate the desired mapping scheme. As an example, the index of refraction profiles for the signal processing regions 51', 61', 71', 81", 91", 101" may be selected and controlled during manufacturing such that the optical signal from the fiber 11 aligned with the signal processing region 51' passes through each of the signal processing regions 51', 61', 71', 81", 91", 101" and is received by the fiber 12 aligned with the signal processing region 101", as described above. Thus, when the optical device 100 is arranged as shown by FIG. 10, the optical signal 28 is forwarded by the device 100 from the optical fiber 11 aligned with the signals processing region 51' to the optical fiber 12 aligned with the signal processing region 101". Moreover, the signal from any fiber 11 may be processed by one or more functional layers of the device 100 in any way as may be desired.

In this regard, a mapping scheme for the optical device 100 may be predefined. For example, in order to implement a desired network configuration, a service provider may specify how optical signals from a plurality of optical fibers 11, are to be mapped by the optical device 100 to a plurality of optical fibers 12, including how the optical signals are to be processed by the optical device 100 as they propagate through the device 100. Based on this mapping scheme, the layers of the device 100 may be formed (and the indexes of refraction controlled) according to the techniques described herein sot that the device 100 implements the desired mapping scheme.

Now, therefore, the following is claimed:

1. An optical communication system, comprising:
a first optical fiber;
a second optical fiber; and
an optical device optically interfaced with the first optical fiber and the second optical fiber such that the first optical fiber is not aligned with second optical fiber, the optical device having a plurality of functional layers, wherein each functional layer of the plurality of functional layers is configured to perform at least one optical function, the plurality of functional layers including at least a first functional layer and a second functional layer, the optical device having at least one buffer layer separating the plurality of functional layers, wherein the at least one buffer layer does not alter a path of an optical signal travelling through the at least one buffer layer, the first functional layer having a first signal processing region aligned with the first optical fiber and the second functional layer having a second signal processing region not aligned with the first optical fiber, the first signal processing region having an index of refraction profile for which an index of refraction of the first signal processing region is spatially varied for changing a path of an optical signal from the first optical fiber such that the optical signal is directed to the second signal processing region and passes through the second signal processing region to the second optical fiber.

2. The system of claim 1, wherein an index of refraction profile is selected for each of a plurality of signal processing regions, including at least the first signal processing region, the second signal processing region, and a third signal processing region of a third functional layer of the plurality of functional layers, such that the optical signal is redirected within the optical device for reception by the second optical fiber.

3. The system of claim 1, wherein the at least one buffer layer includes a first buffer layer having (1) a first surface through which the optical signal enters the first buffer layer and (2) a second surface through which the optical signal exits the first buffer layer, and wherein the first buffer layer has a constant index of refraction from the first surface to the second surface.

4. The system of claim 1, wherein the plurality of functional layers includes a third functional layer having a third signal processing region through which the optical signal passes, and wherein the third signal processing region has an index of refraction profile for performing at least one operation on the optical signal.

5. The system of claim 4, wherein the at least one operation includes filtering the optical signal.

6. The system of claim 4, wherein the at least one operation includes splitting the optical signal.

7. The system of claim 4, wherein the at least one operation includes collimating the optical signal.

8. The system of claim 4, wherein the at least one operation includes focusing the optical signal.

9. The system of claim 1, wherein the first optical fiber and the second optical fiber abut opposite surfaces of the optical device.

10. An optical device, comprising:
a plurality of functional layers, wherein each functional layer of the plurality of functional layers is configured to perform at least one optical function; and
at least one buffer layer positioned between the plurality of functional layers such that each of the plurality of functional layers is separated from another of the plurality of functional layers by the at least one buffer layer, wherein the at least one buffer layer does not alter a path of an optical signal travelling through the at least one buffer layer, wherein each of the plurality of functional layers has a plurality of signal processing regions for processing a plurality of optical signals, wherein an index of refraction profile is selected for each of the plurality of signal processing regions such that the plurality of optical signals are mapped by the optical device from a first plurality of optical fibers to a second plurality of optical fibers according to a predefined mapping scheme, wherein the optical device maps an optical signal from a first optical fiber of the first plurality of optical fibers such that the optical signal is redirected within the optical device for reception by a second optical fiber of the second plurality of optical fibers that is not aligned with the first optical fiber, and wherein an index of refraction for an index of refraction profile for at least one of the plurality of signal processing regions is spatially varied for changing a path of the optical signal.

11. The optical device of claim 10, wherein the at least one buffer layer includes a first buffer layer having (1) a first surface through which at least one of the plurality of optical signals enters the first buffer layer and (2) a second surface through which the at least one of the plurality of optical signals exits the first buffer layer, and wherein the first buffer layer has a constant index of refraction from the first surface to the second surface.

12. The optical device of claim 10, wherein one of the plurality of signal processing regions has an index of refraction profile for performing at least one operation on one of the plurality of optical signals.

13. The optical device of claim 12, wherein the at least one operation includes filtering the at least one of the plurality of optical signals.

14. The optical device of claim 12, wherein the at least one operation includes splitting the at least one of the plurality of optical signals.

15. The optical device of claim 12, wherein the at least one operation includes collimating the at least one of the plurality of optical signals.

16. The optical device of claim 12, wherein the at least one operation includes focusing the at least one of the plurality of optical signals.

17. An optical communication method, comprising:
receiving, at an optical device, an optical signal from a first optical fiber; and
redirecting the optical signal within the optical device such that the optical signal is received by a second optical fiber that is not aligned with the first optical fiber, the optical device having a plurality of functional layers, wherein each functional layer of the plurality of functional layers is configured to perform at least one optical function, the plurality of functional layers including at least a first functional layer and a second functional layer, and at least one buffer layer separating the plurality of functional layers, wherein the at least one buffer layer does not alter a path of an optical signal travelling through the at least one buffer layer, wherein the first functional layer has a first signal processing region aligned with the first optical fiber, wherein the second functional layer has a second signal processing region not aligned with the first optical fiber, and wherein the redirecting comprises changing a path of the optical signal with the first signal processing region according to an index of refraction profile of the first signal processing region such that the optical signal is directed to the second signal processing region and passes through the second signal processing region to the second optical fiber, wherein an index of refraction for the index of refraction profile is spatially varied for changing a path of the optical signal as it is passing through the first signal processing region.

18. The method of claim 17, wherein the at least one buffer layer includes a first buffer layer having (1) a first surface through which the optical signal enters the first buffer layer and (2) a second surface through which the optical signal exits the first buffer layer, and wherein the first buffer layer has a constant index of refraction from the first surface to the second surface.

19. The method of claim 17, wherein the plurality of functional layers includes a third functional layer having a third signal processing region through which the optical signal passes, and wherein the method comprises performing at least one operation on the optical signal with the third signal processing region according to an index of refraction profile for the third signal processing region.

20. The method of claim 19, wherein the performing at least one operation comprises filtering the optical signal.

21. The method of claim 19, wherein the performing at least one operation comprises splitting the optical signal.

22. The method of claim 19, wherein the performing at least one operation comprises collimating the optical signal.

23. The method of claim 19, wherein the performing at least one operation comprises focusing the optical signal.

* * * * *